April 18, 1933. M. P. WHITNEY 1,904,186
BRAKE MECHANISM
Filed June 19, 1930 3 Sheets-Sheet 2

INVENTOR
Maurice P. Whitney
BY Clinton S. Janes
ATTORNEY

April 18, 1933.                M. P. WHITNEY                1,904,186
                              BRAKE MECHANISM
                         Filed June 19, 1930           3 Sheets-Sheet 3

INVENTOR
Maurice P. Whitney
BY Clinton S. Janes
ATTORNEY

Patented Apr. 18, 1933

1,904,186

UNITED STATES PATENT OFFICE

MAURICE P. WHITNEY, OF ELMIRA, NEW YORK, ASSIGNOR TO ECLIPSE MACHINE COMPANY, OF ELMIRA, NEW YORK, A CORPORATION OF NEW YORK

BRAKE MECHANISM

Application filed June 19, 1930. Serial No. 462,185.

The present invention relates to brake mechanism and more particularly to brake mechanism for aeroplane wheels of the so-called "air-wheel" type in which the cross section of the tire is increased to such an extent that the mounting rim is placed directly on the hub and is in effect a part thereof.

In designing brakes for wheels of this character, difficulty has been encountered in securing adequate braking surfaces within the necessarily small permissible diameters, and in disposing of the heat generated through the braking action without incurring injurious effects on the tire and associated parts. Furthermore, it has been found to be difficult to design a brake located within the hub of the wheel without lengthening the hub so as to increase the overhang, thus requiring larger and heavier axles and associated parts for adequate strength.

Brakes of this character as heretofore constructed are also subjected to considerable wear in use, necessitating adjustments of the braking members to secure full application and complete release of the brakes without unduly long travel of the control members.

One object of the present invention is to provide a novel brake of the above character which is strong, light, and of generally improved efficiency.

Another object of the invention is to provide such a brake mechanism in which the wheel hub is short and is located closely adjacent the frame support member so as to reduce the overhang of the wheel.

A further object is to provide such a mechanism in which the bearings for the wheel are readily adjustable without affecting the adjustment of the brake members.

Another object is to provide such a device in which the necessity for accurate adjustment of the braking elements is obviated.

A still further object of the invention is to provide such a device in which provision is made for a quick take-up of the play in the brake parts on initial actuation of the control members, the further application of the brakes being controlled through connections giving the operator a greater mechanical advantage.

Further objects and advantages will be apparent to those skilled in the art from the following description taken in connection with the accompanying drawings.

In the drawings:—

Figure 1:
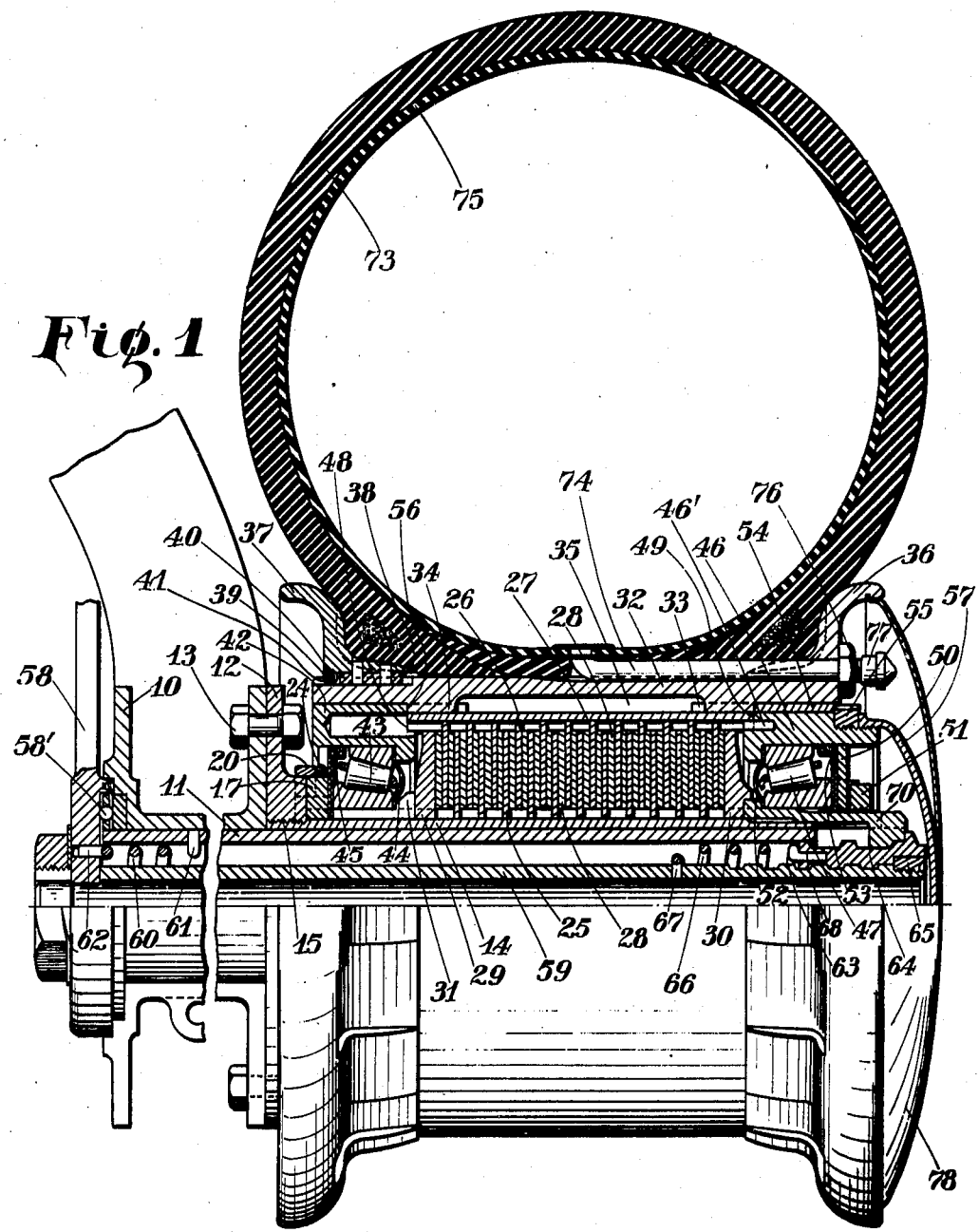
Fig. 1 is a vertical section partly in elevation of a wheel and hub embodying the present invention.

Referring first to Fig. 1 of the drawings, a frame support member 10 is shown forming a part of the usual landing gear and carrying a stationary hollow axle member 11. An anchoring and mounting plate member 12 is adapted to be rigidly fixed to the support member 10 by suitable means such as bolts 13 which are evenly spaced about the contacting flanges of said members in order to provide for rotary adjustment of the mounting plate member 12.

Figure 2:
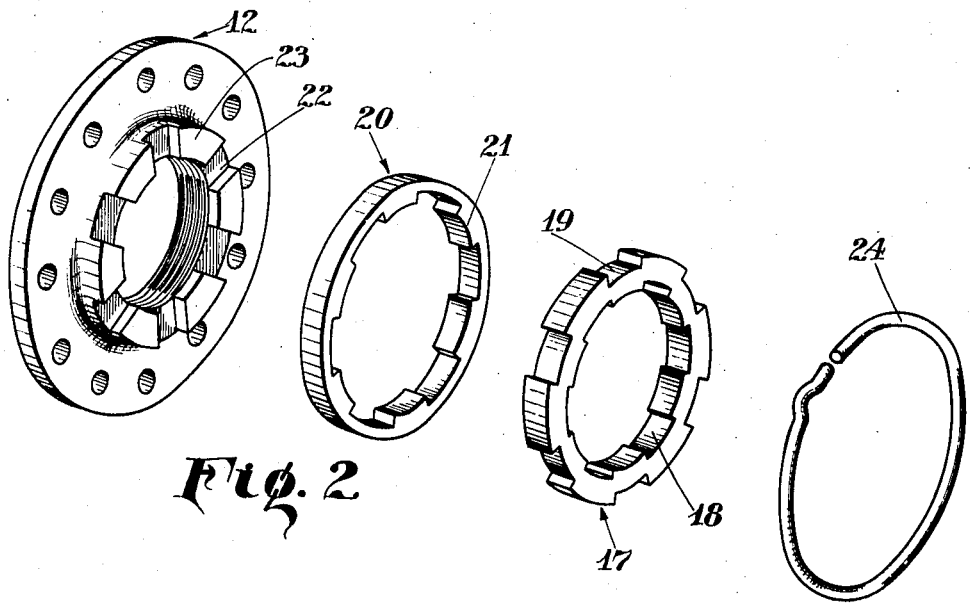
Fig. 2 is a perspective view of the locking elements for the anchoring sleeve, shown in disassembled relation.
Figure 5:
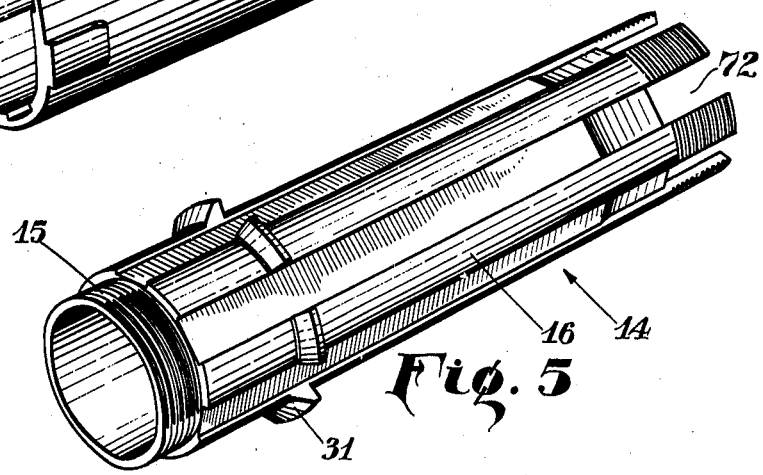
Fig. 5 is a perspective detail of the inner brake sleeve or anchor member.

An anchor member in the form of a sleeve 14 is freely mounted upon the axle 11 and is threaded at 15 within the mounting member 12. Sleeve 14, as shown more particularly in Fig. 5, is externally splined throughout most of its length as indicated at 16. A coupling ring 17 (Fig. 2) is formed with internal spline grooves 18 adapted to fit the splines 16 of sleeve 14 and is provided with external spline grooves 19. A locking ring 20 is adapted to fit the circumference of ring 17 and is provided with internal splines 21 adapted to fit within the external grooves 19 of ring 17 and also to fit within radial key-ways 22 formed in an offset portion 23 of the mounting member 12. It will be seen by reference to Fig. 1 that the rings 17 and 20 may be placed upon the anchor member 14 in concentric relation while the anchor member is being threaded into the mounting member 12 and that thereafter the locking ring 20 may be displaced to the left in Fig. 1 until the splines 21 engage the key-ways 22 of mounting member 12, whereupon the anchoring sleeve will be effectively coupled to said mounting member. Locking ring 20 may be retained in this position by suitable means such as a spring ring 24 which may be snapped in place behind the locking ring 20 after the parts are assembled.

The brake elements in the embodiment of the invention here illustrated consist of a series of interleaved disks 25 and 26, disks 25 being splined to the anchoring sleeve 14 and disks 26 to an outer brake sleeve or hub member 27. Intermediate friction rings 28 are intercalated between the disk members in order to increase the braking effect. The brake members 25, 26, and 28 are confined between abutment members 29 and 30 in the form of disks splined on the anchoring sleeve 14, abutment member 29 resting against stop lugs 31 formed on the splines 16 of said anchoring sleeve 14, and abutment member 30 being slidable on said sleeve to regulate the pressure between the brake members.

A demountable rim member 32 is splined upon the hub member 27 as indicated at 33 and 34, said rim member being recessed as indicated at 35 to form an annular space around the central portion of said hub member for the purpose of heat insulation. Rim member 32 is provided on one side with an integral tire flange 36, and on the other side with a detachable flange 37 splined to said rim as indicated at 38 and locked thereon by suitable means such as a spring ring 39 engaging in complementary recesses 40 and 41 in said flange and rim member respectively.

Rim 32 is supported at one side on an end hub member 42 which is mounted on an anti-friction radial and thrust bearing 43 mounted on the anchoring sleeve 14 between the lugs 31 thereon and the coupling ring 17. Packing members 44 and 45 are preferably provided on opposite sides of said bearing to retain lubricant therein. Bearing 43, coupling ring 17 and plate member 12 are arranged to allow the rim to be mounted as close as possible to the frame support member 10 in order to cut down the overhang of the wheel. As shown in Fig. 1, the rim 32 is so mounted that the flange 37 thereof extends over and around the plate member 12.

The opposite end of rim 32 is supported on an outer end hub member 46 which is mounted on a similar anti-friction bearing 47 which has a sliding fit on the outer end of the anchoring sleeve 14. The end hub members 42 and 46 are suitably formed with shoulders at their inner faces as indicated at 48 and 49 adapted to receive and support the ends of hub member 27 and form therewith a complete hub which is held in assembled relation by the bearings 43 and 47.

Figure 6:
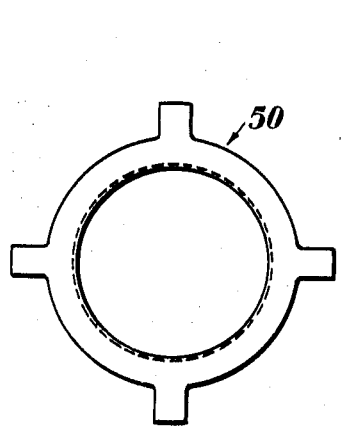
Fig. 6 is a detail in elevation of the bearing adjusting member.

Bearing 43 is prevented from moving to the left in Fig. 1 by the coupling ring 17 and mounting member 12, while bearing 47 is maintained in adjusted position by suitable means such as an adjusting member 50 (Fig. 6) and lock nut 51 threaded on the end of the anchoring sleeve 14. The bearing 47 is also preferably provided with packing elements 52 and 53 for retaining lubricant therein.

A spacing ring 54 of a thickness equal to the depth of splines 33 and 34 is pressed within the rim member 32 to form a suitable bearing for the end hub member 46. A retaining ring 55 is threaded on the outer end of hub member 46 and bears against the end of spacing ring 54 to retain the rim 32 fixed upon the hub, hub member 42 being formed with a shoulder 56 which acts as a stop for the rim 32 by bearing against the ends of the splines 34 thereof. A pin 46' is preferably provided to extend laterally from hub member 46 and engage in an internal spline of the hub member 27 in order to prevent relative rotation between said hub members and thus facilitate tightening the locking ring 55 on hub member 46. A cap member 57 is also preferably threaded on the outer end of hub member 46 to lock the ring 55 in place and to enclose the end of the hub.

The operating mechanism for the brake comprises an operating lever 58 rigidly mounted on the end of a rotary operating shaft 59 and yieldably retained in its normal position by suitable means such as a torsion spring 60 anchored at one end 61 to the interior of axle 11 and at its other end 62 to said operating lever 58. Lever 58 is adapted to bear laterally against the inner side of the frame support 10, an anti-friction thrust bearing 58' being preferably interposed therebetween.

Figure 3:
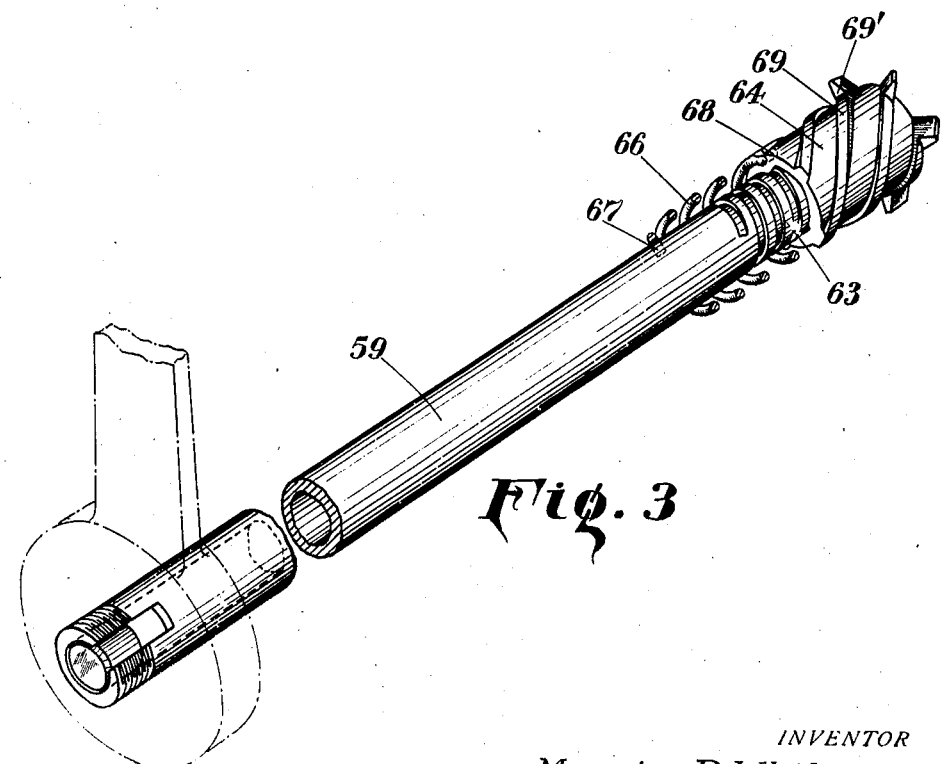
Fig. 3 is a perspective detail of certain of the operating members for the brake mechanism.
Figure 4:
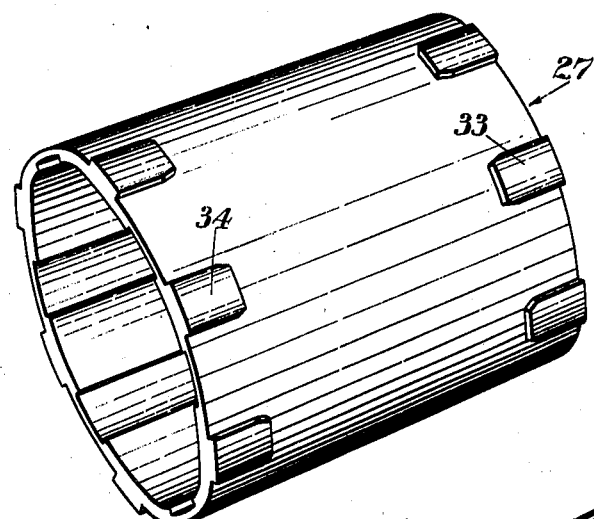
Fig. 4 is a perspective detail of the outer brake sleeve or hub member.

Operating shaft 59 extends freely through the axle 11 and is provided at its outer end with a screw thread 63 (Fig. 3) of comparatively low pitch. A nut member 64 is threaded on the end of shaft 59 and is normally retained against a stop member such as a ring 65 (Fig. 1) threaded on the outer end of said shaft, by means such as the torsion spring 66 anchored at 67 to said shaft and at 68 to said nut.

Figure 7:
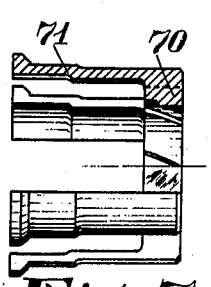
Fig. 7 is a longitudinal section partly in elevation of the pressure element for controlling the brake.
Figure 8:
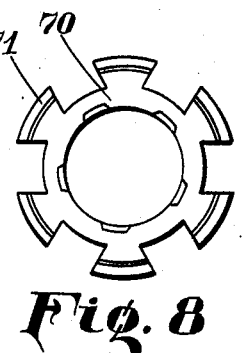
Fig. 8 is an end view of the same.

Nut member 64 is provided on the exterior thereof with a thread 69 of a comparatively steep pitch, and an outer nut member 70 (Figs. 7 and 8) is threaded thereon, normally resting against abutment 69' formed on the ends of threads 69. Nut member 70 is provided with inwardly projecting fingers 71 which are adapted to engage slidably in the grooves between the splines 16 of anchoring sleeve 14 and bear at their ends on the slidable abutment member 30 for the brake members. It will be seen by reference specifically to Figs. 1 and 5 of the drawings that the splined grooves of the anchoring sleeve 14 are cut through said sleeve at its outer end as indicated at 72 and that the fingers 71 of nut member 70 extend outwardly through these spaces and then longitudinally toward the abutment member 30 so that said nut member is effectively splined to the anchoring sleeve while capable of longitudinal movement with respect thereto.

A tire 73 which may be of any suitable construction is mounted in the usual way upon the rim 32, the valve stem 74 of the inner tube 75 thereof being bent at right angles so as to extend through the rim flange 36 as indicated at 76 where it is provided with the usual sealing cap 77. A sheet metal cap 78 may be provided to fit within the rim flange 36 to enclose all projecting parts and assist in streamlining the wheel.

It will be understood that the operating lever 58 will be suitably connected to a manual operating connection of any preferred type within the fuselage of the vehicle.

In operation, rotation of operating lever 58 under the control of the operator causes rotation of shaft 59 in a direction to move the nut members 64 and 70 inwardly thereon. Nut member 64 initially rotates with shaft 59 by reason of the tension of spring 66 which resists the relative rotation between shaft 59 and nut 64. Since the outer nut member 70 is prevented from rotation by its splined relation with the anchor member 14, said nut member 70 is moved to the left in Fig. 1 upon the inner nut member 64, and presses abutment member 30 inwardly to cause initial engagement of the brake members.

Since the pitch of the threads between the members 64 and 70 is comparatively steep, a relatively small angular movement is required to effect the initial engagement of the brake members. When, however, the initial lost motion is taken up and effective resistance to further motion of the nut member 70 is encountered, members 64 and 70 become locked together by reason of the steepness of the threads therebetween. Further rotation of shaft 59 causes nut member 64 to be moved inwardly thereon by reason of the low pitch threads therebetween thus allowing the operator to apply a powerful braking effect without undue exertion on the operating lever 58.

On release of lever 58, nut member 64 will first be rotated back to its initial position by means of the torsion spring 66, and thereafter the outer nut member 70 will be returned to its initial position.

It will be apparent from the foregoing description that there is here provided a braking mechanism in which the parts are so arranged that the overhang of the wheel with respect to the frame support is not increased, and in which adjustments of the braking elements are rendered unnecessary by reason of the quick take-up provided by the high pitch threads of the nut member 70 while the low pitch threads of the operating shaft 59 provide any desired mechanical advantage for the operator in controlling the braking pressure.

Although but one embodiment of the invention has been shown and described in detail, it will be understood that this embodiment is not exclusive and various changes may be made in the construction and arrangement of the parts without departing from the spirit of the invention.

Reference will therefore be had to the claims appended hereto to define the limits of the invention.

What is claimed is:—

1. Braking mechanism for automotive vehicles including a frame support, an axle mounted thereon, an anchor member mounted on said axle and rigidly coupled to said frame support, a rim journaled on said anchor member adjacent said support, and cooperating brake members connected respectively to said rim and anchor member.

2. Braking mechanism for automotive vehicles including a frame support, an axle mounted thereon, an anchor member mounted on said axle and rigidly coupled to said frame support, a rim journaled on said anchor member adjacent said support, cooperating brake disks splined respectively to said rim and anchor member, said anchor member having means thereon to space the disks from the frame support, and means under the control of the operator for pressing the disks toward said frame support.

3. Braking mechanism for automotive vehicles including a frame support, a hollow axle mounted thereon, an anchor member mounted on said axle and rigidly coupled to said frame support, a rim journaled on said anchor member adjacent said support, cooperating brake disks splined respectively to said rim and anchor member, the anchor member having means thereon to space the disks from the frame support, and means under the control of the operator and extending through said frame support and axle for pressing the disks toward said frame support.

4. Brake mechanism for automotive vehicles including a frame support, an axle mounted thereon, an anchor member mounted on said axle, a rim journaled on said anchor member, cooperating brake mechanism on said rim and anchor member, and a coupling member extending within said rim and rigidly connected to the anchor member and frame support.

5. Brake mechanism for automotive vehicles including a frame support, an axle mounted thereon, an anchor member freely mounted on said axle, a rim journaled on said anchor member, cooperating brake mechanism on said rim and anchor member, and a coupling plate member extending within said rim and rigidly but detachably connected to the anchor member and frame support.

6. Brake mechanism for automotive vehicles including a frame support, an axle mounted therein, an anchor member freely mounted on said axle, a rim journaled on said anchor member, cooperating brake mechanism on said rim and anchor member, a coupling plate member extending within said rim and rigidly but detachably connected to the frame support, said anchor member being threaded into said plate member, and means for locking said anchor member to said plate member.

7. Braking mechanism for automotive vehicles including a frame support, an axle mounted therein, an anchor member freely mounted on said axle, a rim journaled on said anchor member, cooperating brake mechanism on said rim and anchor member, a coupling plate member extending within said rim and rigidly but detachably connected to the frame support, said anchor member being threaded into said plate member, a locking ring splined to said anchor member, said ring and plate member having keying grooves adapted to register, and keying means adapted to enter said grooves and prevent relative rotation between said members.

8. Brake mechanism including rotary and stationary brake members and brake applying means including screw and nut gearing having a threaded connection of high pitch and a second threaded connection of low pitch, and yielding means for resisting the operation of the threaded connection of low pitch.

9. Brake mechanism including rotary and stationary bake disks and means under the control of the operator for applying pressure to said disks including screw and nut gearing having a threaded connection of high pitch and a second threaded connection of low pitch in series therewith, and yielding means for resisting the operation of the threaded connection of low pitch.

10. Brake mechanism including rotary and stationary brake disks and means under the control of the operator for applying pressure to said disks including a rotary control shaft, a non-rotatable pressure member, and a pair of threaded connections in series therebetween, one connection being of high pitch but irreversible, the other connection being of low pitch, and yielding means resisting the operation of the threaded element of low pitch.

11. Brake mechanism including rotary and stationary brake disks and means under the control of the operator for applying pressure to said disks including a manually rotated control shaft, a non-rotatable threaded pressure member, and an internally and externally threaded sleeve mounted on the controlling shaft and within the nut member, the threads between said members being of different pitch but of the same hand, and means for yieldably maintaining the low pitch threaded elements in normal position.

12. A brake mechanism including rotary and stationary brake disks and means under the control of the operator for applying pressure to said disks including a manually rotated control shaft, a non-rotatable threaded pressure member, and an internally and externally threaded sleeve mounted on the controlling shaft and within the nut member, the threads between said members being of the same hand and irreversible but of different pitch, and a torsion spring for yieldably maintaining the low pitch threaded elements in normal position.

13. Aeroplane wheel and brake mechanism including a frame support member, an axle mounted therein, an anchor member freely mounted on said axle and rigidly coupled to said support member, a rim member journaled on said anchor member adjacent said support, cooperating brake members alternately splined to said rim and anchor member, said anchor member having abutment means for spacing said disks from the coupling for said anchor member, and a bearing for said rim on said anchor member mounted within said space.

14. Aeroplane wheel and brake mechanism including a frame support member, an axle mounted therein, an anchor member freely mounted on said axle and rigidly coupled to said support member, a rim member journaled on said anchor member adjacent said support, cooperating brake members alternately splined to said rim and anchor member, said anchor member having abutment means for spacing said disks from the coupling for said anchor member, a bearing for said rim on said anchor member mounted within said space, a pressure member splined to the free end of said anchor member, means extending through said axle for operating said pressure member, a second bearing for said rim mounted adjacent the free end of the anchor member and surrounding said pressure member and an adjustable abutment on the end of the anchor member for retaining the rim and the bearings in assembled relation.

15. In a device of the class described, a frame support, a hollow axle traversing said support, rigidly mounted therein and extending laterally therefrom, a wheel rim journaled on the extended portion of said axle adjacent said support, brake members located between the rim and axle, a brake controlling element mounted on said axle at the opposite side of said support from said rim, brake operating elements located adjacent the free side of said rim and means traversing said axle for operatively connecting said controlling element with said operating elements.

16. Brake mechanism including rotary and stationary brake members, brake applying means including a driving member, a driven brake-applying member and an intermediate connecting member, said intermediate member having a connection with one of said first named members of low mechanical advantage in the direction of application of brake applying forces and a connection with the other said member of high mechanical advantage, and yielding means resisting the functioning of the connection of high mechanical advantage.

17. Brake applying mechanism including rotary and stationary brake members, and brake applying means including a rotary driving member, a longitudinally movable driven member and a floating intermediate connecting member, said intermediate member having a connection with one of said first named members whereby relative rotation causes relative translation with a comparatively low mechanical advantage, and said intermediate member having a similar connection with the other of said members with a comparatively high mechanical advantage; and yielding means for opposing relative rotation between the intermediate and the last mentioned members.

18. Brake applying mechanism including rotary and stationary brake members, and brake applying means including a rotary driving member, a longitudinally movable driven member and a floating intermediate connecting member, said intermediate member and driven member having a connection therebetween such that rotation of the intermediate member causes longitudinal movement of the driven member in a direction to apply the brakes with a comparatively low mechanical advantage, and said driving member and intermediate member having a similar connection of comparatively high mechanical advantage; and yielding means resisting relative rotation between the driving and intermediate members.

In testimony whereof I have signed this specification.

MAURICE P. WHITNEY.